(12) United States Patent
Schefczik et al.

(10) Patent No.: US 11,832,248 B2
(45) Date of Patent: Nov. 28, 2023

(54) RESOURCE MANAGEMENT IN CLOUD RADIO ACCESS NETWORKS

(71) Applicant: NOKIA SOLUTIONS AND NETWORKS OY, Espoo (FI)

(72) Inventors: Peter Schefczik, Erlangen (DE); Bernd Haberland, Stuttgart (DE); Ralf Klotsche, Neuenbuerg (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 553 days.

(21) Appl. No.: 16/758,753

(22) PCT Filed: Oct. 24, 2017

(86) PCT No.: PCT/EP2017/077164
§ 371 (c)(1),
(2) Date: Apr. 23, 2020

(87) PCT Pub. No.: WO2019/080997
PCT Pub. Date: May 2, 2019

(65) Prior Publication Data
US 2020/0260427 A1 Aug. 13, 2020

(51) Int. Cl.
*H04W 72/00* (2023.01)
*H04W 72/20* (2023.01)
*H04W 72/12* (2023.01)

(52) U.S. Cl.
CPC .......... *H04W 72/20* (2023.01); *H04W 72/12* (2013.01)

(58) Field of Classification Search
CPC .................. H04W 72/0406; H04W 72/12
See application file for complete search history.

(56) References Cited

U.S. PATENT DOCUMENTS

2016/0113018 A1  4/2016 Li
2016/0301960 A1* 10/2016 Sze ................. H04N 21/6373
(Continued)

FOREIGN PATENT DOCUMENTS

CN  106879022 A  6/2017
CN  107113195 A  8/2017
(Continued)

OTHER PUBLICATIONS

International Search Report and Written Opinion dated Jun. 22, 2018 corresponding to International Patent Application No. PCT/EP2017/077164.
(Continued)

*Primary Examiner* — Rhonda L Murphy
(74) *Attorney, Agent, or Firm* — SQUIRE PATTON BOGGS (US) LLP

(57) ABSTRACT

Apparatuses and methods in a communication system are provided. The solution comprises operating a radio access network, where the radio access network comprises two or more resource tiers, each tier having different latency/timing requirements. The resource allocation for the radio access network is realised (200) with two or more control loops, where each control loop is configured to allocate resources with different latency requirements, and control resources between the tiers. Resources of the inmost tier are controlled (202) by an inmost control loop with lowest latency resource allocation, and resources of the outer tiers are controlled (204) by one or more outer control loops for less latency critical resource allocation, each outer control loop having less critical latency requirement compared to loops closer to the inmost loop.

14 Claims, 4 Drawing Sheets

(56) References Cited

U.S. PATENT DOCUMENTS

| | | |
|---|---|---|
| 2017/0156065 A1 | 6/2017 | Bhattacharjee et al. |
| 2017/0214624 A1 | 7/2017 | Grob-Lipski et al. |
| 2017/0231011 A1 | 8/2017 | Park et al. |

FOREIGN PATENT DOCUMENTS

| | | |
|---|---|---|
| EP | 3306987 A1 * | 4/2018 |
| WO | WO 2016/074702 A1 | 5/2016 |

OTHER PUBLICATIONS

NGMN Alliance: "5G End-to-End Architecture Framework," IEEE Draft; NGMN_E2EARCHFRAMEWORK_V0.8.1, vol. 802, No. V0, Oct. 11, 2017, pp. 1-36, XP068120377.
Chinese Office Action corresponding to CN Application No. 201780097483.3, dated Jan. 28, 2023.
Qualcomm Incorporated, "NR uplink measurement based mobility in the inactive state", 3GPP TSG-RAN2#95bis, Kaohsiung, Taiwan, Oct. 10-14, 2016, R2-167066, 5 pages.

* cited by examiner

RESOURCE MANAGEMENT IN CLOUD RADIO ACCESS NETWORKS

FIELD

The exemplary and non-limiting embodiments of the invention relate generally to wireless communication systems. Embodiments of the invention relate especially to apparatuses, methods, and computer program products in communication networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

Wireless communication systems are under constant development. Currently the so called 5th generation (5G) of mobile communication network is under development. The future communication networks should have a flexible architecture that is able to adapt to a multitude of different use cases, users, sensors, service requirements and network deployments. This is not limited to the usual separation of control from user traffic, but it also has an effect on the structure of the system. It must be decided where to process certain functions of the 5G mobile network.

One possible implementation of realising a flexible communication system is to utilise remote radio heads (RRH) and a cloud based realisation of at least part of the infrastructure of the system. A remote radio head comprises a part of the elements of a conventional base station. Typically, a remote radio head comprises radio frequency equipment, analogue-to-digital/digital-to-analogue converters and up/down converters, for example. Rest of the base station functionality and infrastructure of the system may be situated elsewhere. In a Cloud Radio Access Network (Cloud-RAN) network functions can run on a pool of computing resources including hardware accelerators for special physical (PHY) layer tasks.

Efficient control of the resources of the cloud based system is a challenging task. Traditional clouds are designed to handle a large number of parallel processing tasks. However, the requirements of a communication system are different and controlling a cloud based communication system is not a trivial task, especially in the systems under development delays in resource scheduling must be kept as small as possible.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided a method to operate a radio access network, where the radio access network comprises two or more resource tiers, each tier having different latency/timing requirements, functionalities of the radio access network being realised utilising network slices and microservices, the method comprising: realising resource allocation for the radio access network with two or more control loops, where each control loop is configured to allocate resources with different latency requirements, and configured to control resources between the tiers, controlling resources of the inmost tier by an inmost control loop having the lowest latency resource allocation of the two or more control loops, and controlling resources of the outer tiers by one or more outer control loops for less latency critical resource allocation, each outer control loop having less critical latency requirement compared to loops closer to the inmost loop wherein an outer control loop is responsible for dynamic deployment/redeployment of microservices according to resource usage statistics from a middle control loop, a middle control loop is responsible for intra slice load balancing among microservices according to bandwidth and latency detected by an inner control loop and an inner loop schedules resources within a Transmission Time Interval used in the inmost tier.

According to an aspect of the present invention, there is provided an apparatus in a radio access network where the radio access network comprises two or more resource tiers, each tier having different latency/timing requirements, functionalities of the radio access network being realised utilising network slices and microservices, the apparatus comprising: at least one processor; and at least one memory including computer program code, the at least one memory and the computer program code configured to, with the at least one processor, cause the apparatus at least to: realise resource allocation for the radio access network with two or more control loops, where each control loop is configured to allocate resources with different latency requirements, and configured to control resources between the tiers, control resources of the inmost tier by an inmost control loop having the lowest latency resource allocation of the two or more control loops, and control resources of the outer tiers by one or more outer control loops for less latency critical resource allocation, each outer control loop having less critical latency requirement compared to loops closer to the inmost loop, wherein an outer control loop is responsible for dynamic deployment/redeployment of microservices according to resource usage statistics from a middle control loop, a middle control loop is responsible for intra slice load balancing among microservices according to bandwidth and latency detected by an inner control loop and an inner loop schedules resources within a Transmission Time Interval used in the inmost tier.

LIST OF DRAWINGS

Embodiments of the present invention are described below, by way of example only, with reference to the accompanying drawings, in which FIG. 1 illustrates an example of a communication environment where some embodiments of the invention may be applied FIG. 2 is a flowchart illustrating an embodiment of the invention;

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

Some embodiments of the present invention are applicable to, a base station, eNodeB, a distributed realisation of a base station, a network element of a communication system, a corresponding component, and/or to any communication system or any combination of different communication systems that support required functionality.

The protocols used, the specifications of communication systems, servers and user equipment, especially in wireless communication, develop rapidly. Such development may require extra changes to an embodiment. Therefore, all words and expressions should be interpreted broadly and they are intended to illustrate, not to restrict, embodiments.

Figure 1:
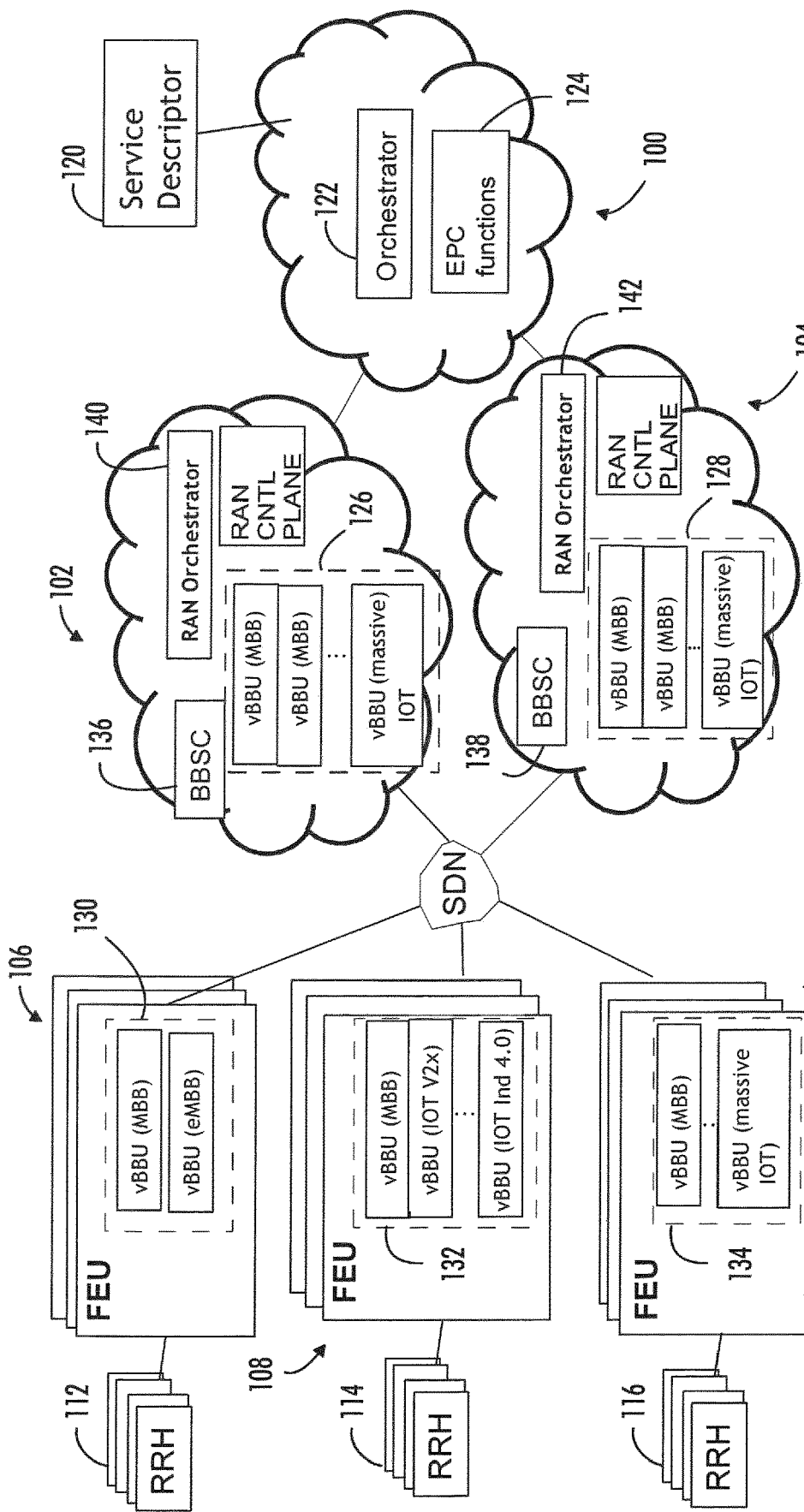

FIG. 1 illustrates a simplified view of a communication environment only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for communication are irrelevant to the invention. Therefore, they need not to be discussed in more detail here.

In the example of FIG. 1, a Cloud Radio Access Network (Cloud-RAN) based system is shown. However, the embodiments described in these examples are not limited to the system illustrated in FIG. 1 which is merely an example of possible system.

The simplified example of a network of FIG. 1 may be divided into three parts, or tiers: a Central Cloud 100, one or more Edge Clouds, EC, 102, 104, and a number of Flexible Front End Units, FEU, 106, 108, 110, to which a set of Remote Radio Heads, RRH, 112, 114, 116 are connected. In an embodiment, Flexible Front End Units may be connected to Edge Clouds via Software defined networks, SDN. Connections between FEUs and Edge Clouds may be denoted as mid haul. Edge Clouds may be connected to Central Cloud via a backhaul network. Connections between RRHs and FEUs may be denoted as front haul.

In an embodiment, different parts or tiers of the system perform different functions. Remote Radio Heads take care of the air interface and radio frequency operation. Typically Flexible Front End Units manage critical latency services. A Front End Unit is a pool of resources controlled with cloud methods. The FEU is to provide ultra-reliable or low latency services to be allocated. The hardware used to realise FEU may be server with dedicated hardware like accelerator boards. FEUs may locate relatively close to the RRHs, but the locations should be easy to access, maintain, cool, and power. Typically n an embodiment, the connections between RRHs and FEUs are realised with fibre and the length of the connecting link is few 100 meters.

In an embodiment, an Edge Cloud is a cloud providing dedicated radio services logically assigned to the network edge, but in a locally centralized way. Typically the service area may be for an area around 20 km diameter around RRHs, for example, depending on the transport network topology. By this aggregation pooling gains are achievable. As in the FEU also here hardware accelerators may be necessary, but the main components may be ordinary servers (off the shelf, OTS). The Edge Cloud hardware is easy to access, maintain, replace or update, cool, and power; but at a bigger scale, thus boosting pooling gains.

In 5G networks a slice concept is proposed. Slices are used for logical resource isolation. A network slice instance is a set of network functions and the resources for these network functions which are arranged and configured to form a complete logical network to meet certain network and quality of service (QoS) characteristics. Each slice may be dedicated to a given type of services having similar network characteristics. For example, one slice may take care of Mobile Broadband, MBB, or enhanced MBB, eMBB, and another slice may be responsible for Internet of Things, IoT, traffic. In the Central Cloud, Service Descriptor 120 take care of abstraction of slice descriptions with Key Performance Indicators, KPIs and location information. Orchestrator 122 is responsible for end-to-end Slice and Multi-Tenancy Management. Central Cloud also comprises Enhanced Packet Core, EPC, functions 124.

In an embodiment, each Edge Cloud comprises a pool 126, 128 of base band units, BBUs. Each FEU may also have a pool 130, 132, 134 of base band units. A BBU summarizes all processing of the data plane and related control before the final modulation (in down link direction, and vice versa in up-link direction). A BBU pool is a set of resources (such as central processing unit, CPUs, accelerators, memories) provided in a cloud to offer the processing of a BBU functionality. A virtual BBU, vBBU, is a set of BBU functionality floating in the cloud, composed of resources from the BBU pool to provide one or more services to a set of users or clients. Typically several vBBUs belong to one cell.

The Base Band Service Chainer, BBSC, 136, 138 is configured to control flexible base band processing and load balancing. RAN Orchestrators 140, 142, are responsible for Multi Slice/Tenancy deployment in Edge Cloud according requests of Orchestrator 122.

FIG. 1 illustrates an example where the network has three separate parts or tiers. In general, the number of parts or tiers may be other than three, which is here use as an example. The latency and timing requirements of the parts or tiers relax the farther away the part or tier is from RRH.

The realisation of above described cloud based radio access system may utilise so called microservices. A microservice is a small component running in its own process and communicating with other microservices via lightweight mechanisms like an HTTP API (Hypertext Transfer Protocol application programming interface). Different microservices can be based on different software architectures, can be implemented in different languages, can be started in different quantities but taken together they can be used to form a more complex application or service. In the context of a radio access system, the vBBU blocks depicted in FIG. 1 may be realized as a microservice and scaled up for the different network slices according the needed capacity. For example, a vBBU (MBB) is a microservice that can process stack components of the Mobile Broadband data radio bearer. The vBBU (Massive IoT), the vBBU (IoT V2x) and the vBBU (IoT ind 4.0) are microservices that can process stack components of the IoT service. The RAN orchestrator and the BBSC may also be separate microservices. The same holds for the Cell Functions microservice and the RAN Control Plane microservice. Of course, such a single microservice still contains different functionalities that could be further separated into smaller microservices in the future.

Depending on the kind of processing task, different requirements may be set for the related microservices (virtual BBUs) carrying out the processing for the needed function. The processing may be user or cell related scheduler processing, extended user processing (xUP), or common cell functions that are instantiated and processed from the beginning even if no user is handled by the RAN. For example, scheduling functions must be carried out and signalled within a given amount of time (1 ms in 4G, presumably 125 µs in 5G). When a new user enters the system with a Data Radio Bearer Setup, the processing resource for the new user entering is allowed to take a few dozens of milliseconds. Deployment of new microservices for handling of upcoming loads, such as future Data Radio Bearer Setups, must be enabled within a few seconds. The problem is now to find and control resources (processing capacity and x-haul bandwidth) for the microservices per network slice, that allow the deployment and management of these virtualized components (microservices) that can cope with the different requirements for the processing tasks described above. Thereby special attention must be turned towards overload situations that can happen in such a system.

State of the art cloud control systems can provide the top most level of the needed functionality, but a radio access network, especially in the emerging 5G, will require timing restrictions which cannot be covered by the known solutions. Traditionally orchestrators are working on CPU loads and cannot refer to Quality of Experience, QoE, parameters of single users. It is known that CPU measurements are error prone, late and often service degradation may be widely uncorrelated with the load of the CPU performing the service. For example, CPU load measurements can never follow in time processing occurring on ms or sub ms basis, which is the case with low latency services.

Therefore, a method is proposed where the control of the fast parts of the system is separated from the control of the slower parts of the radio access system. The flowchart of FIG. 2 illustrates an embodiment.

Figure 2:
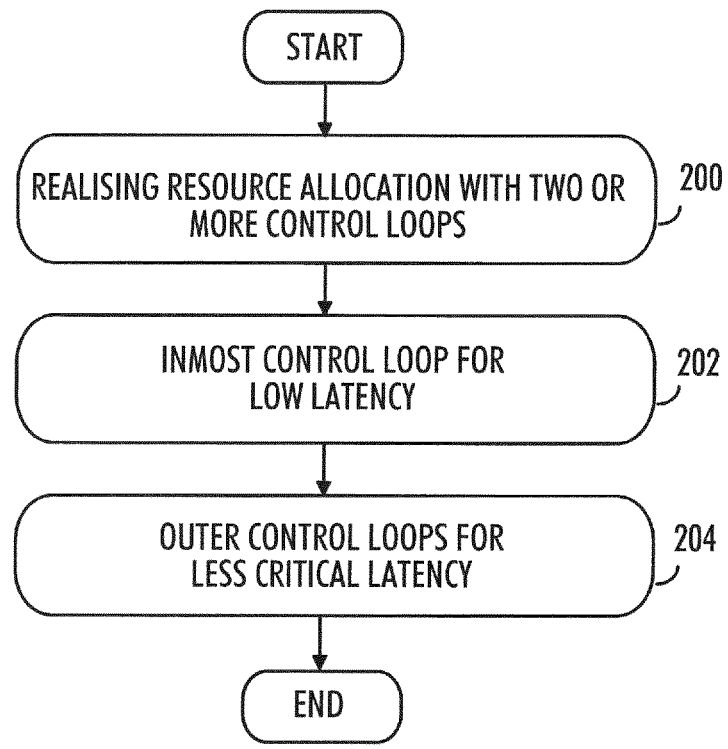

The chart of FIG. 2 illustrates an example to operate a radio access network, where the radio access network comprises two or more resource tiers, such as FEUs, Edge Clouds and Central Cloud, where each tier has different latency/timing requirements. In an embodiment in step 200, the resource allocation for the radio access network is realised with two or more control loops, where each control loop is configured to allocate resources with different latency requirements.

In step 202, resources of an inmost tier are controlled by an inmost control loop with low latency resource allocation.

In step 204, resources of outer tiers are controlled by one or more outer control loops for less latency critical resource allocation, each outer control loop having less critical latency requirement compared to loops closer to the inmost loop.

Furthermore, in an embodiment, data is exchanged between the control loops serving different tiers. Namely if a lower control loop (serving a lower latency process) cannot cope with the current situation it signals an alarm to the next upper control loop, with a less restrictive timing requirement. By utilising this kind of hierarchy contradictive decisions on each tier may be easily prevented. For example, if a fast overload protection performed by inmost control loop does not remedy an impaired service level a load migration may be performed inside the next outer control loop. Further, if this also is not improving the situation (e.g. all computing resources available are fully occupied), then an additional microservice may be instantiated via a further outer control loop, for example.

In an embodiment, depending on the type of processing function to be executed, an associated microservice can be either located in a FEU or in an Edge Cloud or in both. This is illustrated in FIG. 1 where vBBUs may be located in both tiers. The vBBUs in FEUs may process low and legacy latency connections while the VBBUs in Edge Clouds may process only legacy (slower) latency connections.

In an embodiment, a control loop may manage resources of the next inner control loop on the basis of indications transmitted by the next inner control loop.

In an embodiment, when a control loop detects that it is unable to fulfil its resource allocation tasks related to one or more connections, it may transmit an indication to an outer loop. Thus, a control loop may manage resources of an inner control loop on the basis of indications transmitted by the inner control loop.

In an embodiment, when it detected that existing microservices cannot provide service to one or more connections of the radio access network, a control loop may dynamically initialise new microservices or more resources to existing microservices on the basis of the detection.

Figure 3:
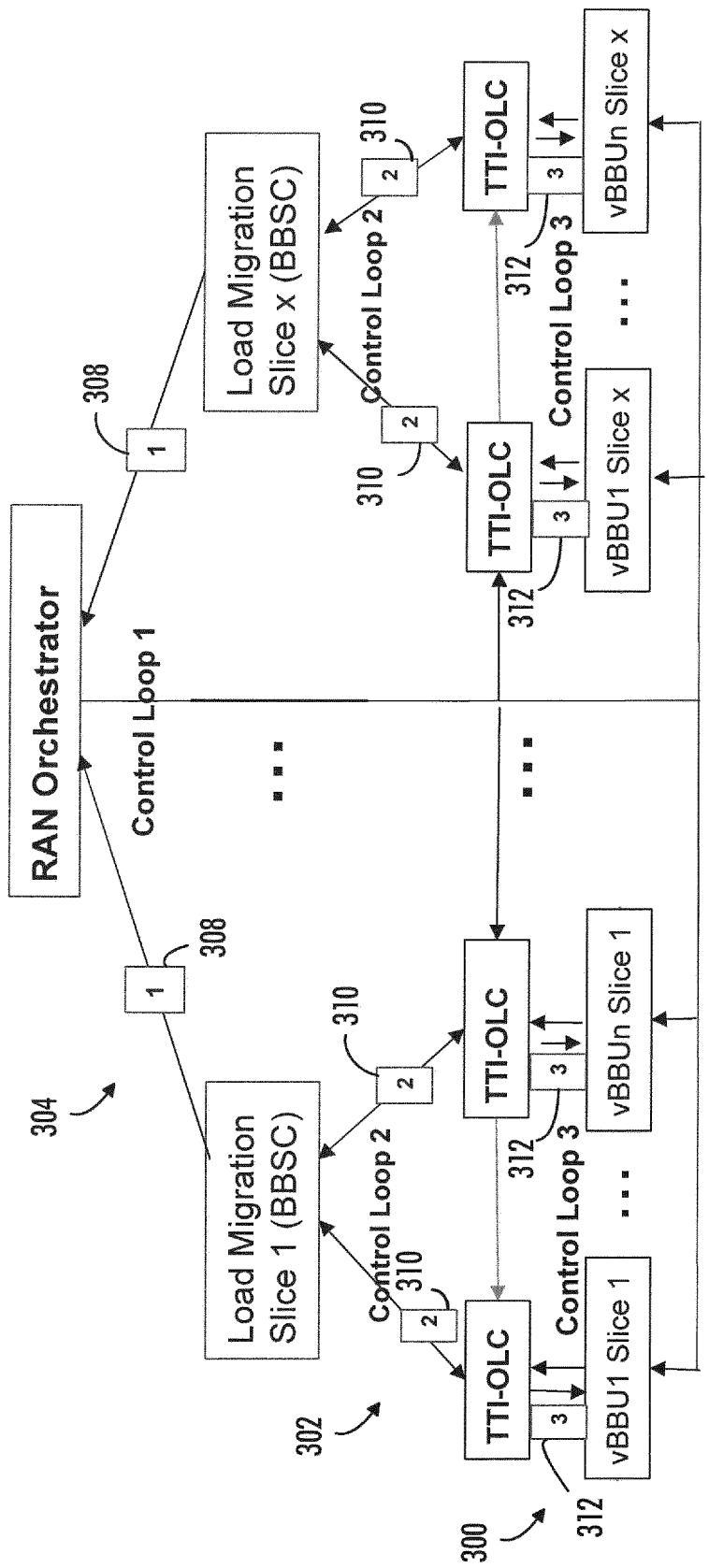
FIG. 3 illustrates an example of realisation of control loops.

FIG. 3 illustrates an example embodiment, where the dynamic resource management architecture consists mainly of three control loops, inner loop (control loop 3) 300, middle loop (control loop 2) 302 and outer loop (control loop 1) 304, stacked on top of each other controlling the microservices distributed over the resources in the FEU and the EC. Thereby certain functions, such as PHYCell function, is only present in an FEU and can be placed on special hardware accelerators, while the other BBU functions (microservices) are all suitable to run on general purpose platform (GPP) hardware.

It may be noted here, the number of control loops is not limited to three. Depending on the system the number of different tiers and control loops may vary, as one skilled in the art is well aware.

One point in the usage of multiple control loops is also the interactions between different control loops and available for each network slice for different types and for multi-tenant scenarios: outer loop interactions 306 resource between RAN orchestrator and BBSC for deployment for various micro-services, and interaction between network slices, mid loop interactions 310 between BBSC and TTI (Transmission Time Interval) based Overload Control to enable resource pool load balancing and inner loop interactions 312 between TTI based Overload Control and vBBUs to clip resource usage bursts within a given configuration.

As mentioned earlier, each control loop may be configured to act with different latency requirements: outer loop 304 on several seconds base, mid loop 302 typically 0.5 sec timing and inner loop 300 with less than 1 ms timing.

These interworking loops enable reactions which are fast enough to keep the QoE stable while allowing cloud to supervise the resources while enabling guaranteed statistical multiplexing gains in a very dynamic cloud environment with respect to resource usage.

Next an example of the operation of different control loops is studied in more detail.

The outer control loop 304 is responsible for the dynamic deployment/redeployment of microservices according resource usage statistics from the BBSC active in the middle control loop 302. This includes the handling of resource requests across slices. For this the BBSC gathers and processes resource usage measurements, such as how often a migration of users from one microservice to another processing resource (microservice) was needed in the past. If the BBSC detects that there are no microservices available to process additional users it either directs the RAN orchestrator to instantiate new microservices or to give more processing resources (cores) to an already existing microservice. It may be noted that the RAN orchestrator provisions baseband processing resources for different network slices, for example for IoT, for MBB or for eMBB services. Of course a redeployment of microservices is executed on the fly during the running system without disturbing ongoing services.

The middle control loop 302 with the BBSC as an active element is responsible for Intra Slice Load Balancing among microservices (vBBUs) by Load Migration in case of bad QoE KPIs within one vBBU detected by the inner control loop 300. This is done by communicating bottlenecks, e.g. in mid-haul bandwidth or mid-haul latency by the inner control loop to the BBSC. The BBSC may be configured to perform migrations for one or more users to take load off from an overloaded microservice. After migration the overload of the microservice in question may be removed. The load migration on Data Radio Bearer (DRB) bases is configured to happen without service interruptions for the related users.

The inner control loop 300, which may be embedded in the Scheduler process consists of the TTI based Overload Control, TTI-OLC, for processing capacity and Mid-Haul Bandwidth usage. This loop constitutes an instantaneous treatment of an overload situation within the Transmission Time Interval TTI time (1 ms or 0.125 ms) and is configured to guarantee an efficient resource provisioning of a microservice avoiding over provisioning.

In an embodiment, the BBSC signals to RAN Orchestrator (RANO) if new microservices should be started, or existing microservices should be deleted, for example if load balancing alone does not remedy the situation. However, the RANO can take this advice or not, depending on its view of the resources or operator policies etc. In addition, the RANO can perform its own control of resources, maybe with measurements from the BBSC. The Central Cloud may in turn control the RANO in an additional outer loop (fourth loop) according to Central Cloud policies. The RANO can either be located in the Edge Cloud (for example in a multivendor situation) or in the Central Cloud.

Figure 4:
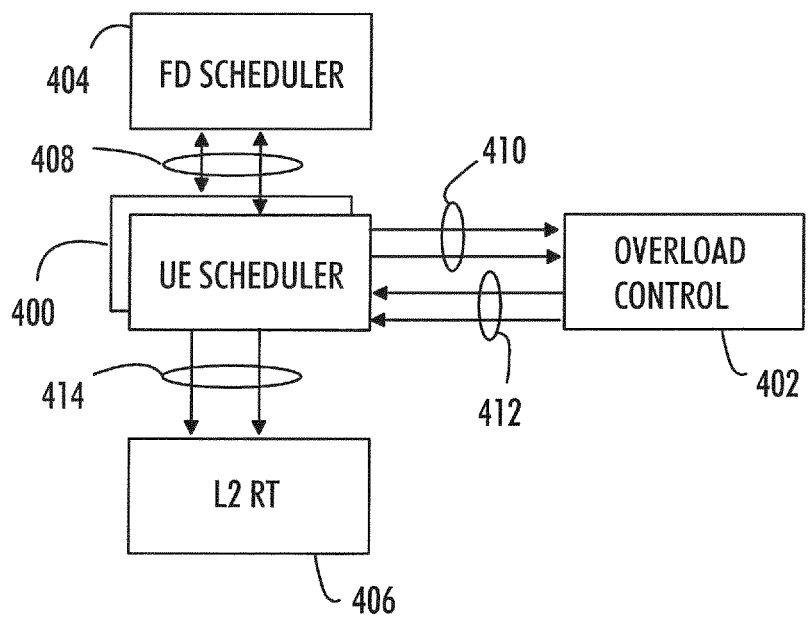
FIG. 4 illustrates an example of controlling mid-haul bandwidth resources and baseband processing resources.

An example implementation is given in FIG. 4 to control mid-haul bandwidth resources and baseband (BB) processing resources allocated to a microservice. In an embodiment, there may be several user equipment (UE) schedulers 400 competing at one overload control module for resources. The UE schedulers may be located in vBBUs either in FEU or Edge Cloud according to the location of the real time part of the vBBU. However in the scheduler architecture there is only one frequency domain (FD) scheduler 440 and one single overload control module 402. The FD scheduler 440 may be located in FEU and the overload control module 402 either in FEU or Edge Cloud according to the location of the UE scheduler.

Each UE scheduler 400 at the Edge Cloud or FEU is configured to estimate mid-haul bandwidth and BB processing effort with scheduler parameter grants 408 from the FD scheduler 404. These UE Schedulers then send resource requests 410 to the overload control module 402. In case the overload control detects an overload situation it is configured to modify the scheduling parameters or skip users for later time slices and return 412 the new or unchanged scheduling parameters back to each UE Scheduler separately. Moreover the overload control reports QoE KPIs to the BBSC for load migration purposes. Finally each UE scheduler applies 414 the new scheduling parameters to the Layer 2 real-time (L2 RT) layer 406.

As mentioned the use of three loops is merely one possible implementation of a control loop hierarchy. Additional control loops may be designed for example for managing bandwidth resources or CPU resources between different access technologies like 4G vs. 5G radio access networks. Also less control loops could be used, for example omitting the above described outer control loop (RAN Orchestrator).

Existing solutions implement a fixed arrangement of processing functions regardless of the load and the service requirements. In existing solutions the radio access network has to be equipped for the maximum traffic expected. Thereby the composition of functions is fixed between the radio access and the network cloud resources and in case of an overload not much can be done to remedy the situation. The proposed solution has many advantages over the existing solutions.

The proposed solution supports the creation and the management of network slices. The inmost loop can handle the TTI based service requirements and thus enables ultra-low latency in future 5G networks. Considerable pooling gains can be realized with less equipment, and overload situations are remedied avoiding over provisioning of resources. The processing placement can be done differently for user and control plane and also according to operator needs. The flexible decomposition of mobile network functions between the radio access and the network cloud infrastructures allows to support fully distributed, partially distributed, and fully centralized architectures. New services and network features can be applied easily. For example adding IoT microservices for new IoT access schemes can be done according to the latency sensitivity of the required service.

Figure 5:
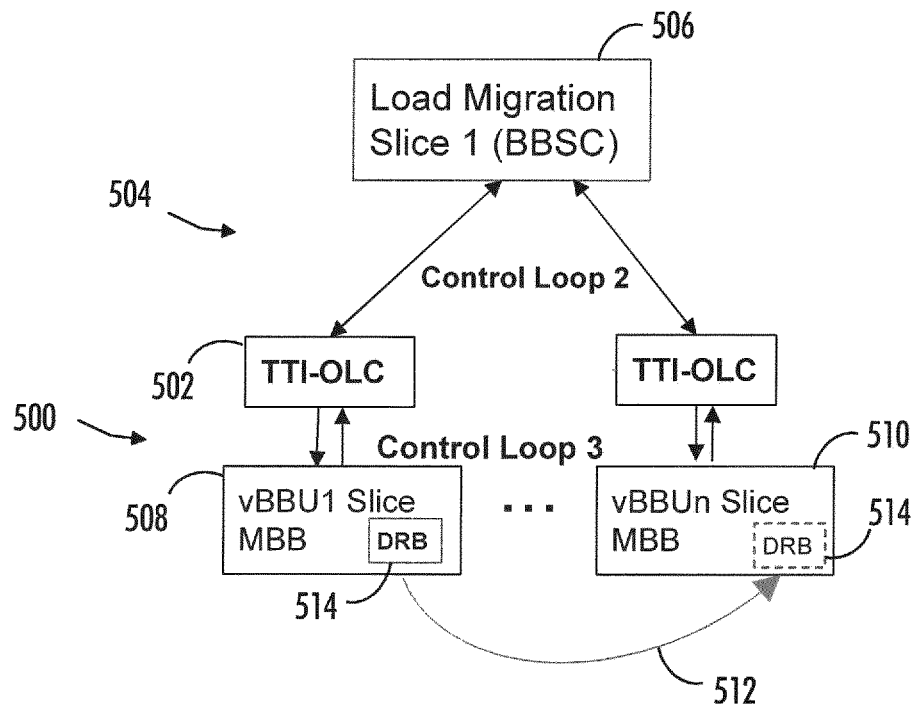
FIG. 5 illustrates an example of load migration.

FIG. 5 illustrates an example how the inner control loop detects a problem it cannot solve and requests next outer loop for resources. The example relates to load migration for a Mobile Broad band Data Radio Bearer, MBB DRB. The example refers to inner control loop 500, where the active element is TTI_OLC 502 and next outer control loop 504 where the active element is BBSC 506. Here we assume that a MBB microservice is active in vBBU1 508 with video traffic on one Data Radio Bearer, DRB 514. Let us further assume that the load of the microservice having the DRB increases.

The TTI_OLC 502 within the inmost control loop 500 (control loop 3) is configured to detect the overload and signal a migration need to the BBSC 506 in next outer control loop 504 (control loop 2).

The BBSC may be configured to select a target MBB microservice in vBBUn 510 to migrate 512 the DRB 514 processing to. The BBSC transmits a request to vBBUn 510 for the instantiation of the DRB 514 in the vBBUn and a request to vBBU1 for the deletion of the DRB 514 in the vBBU1.

Figure 6:
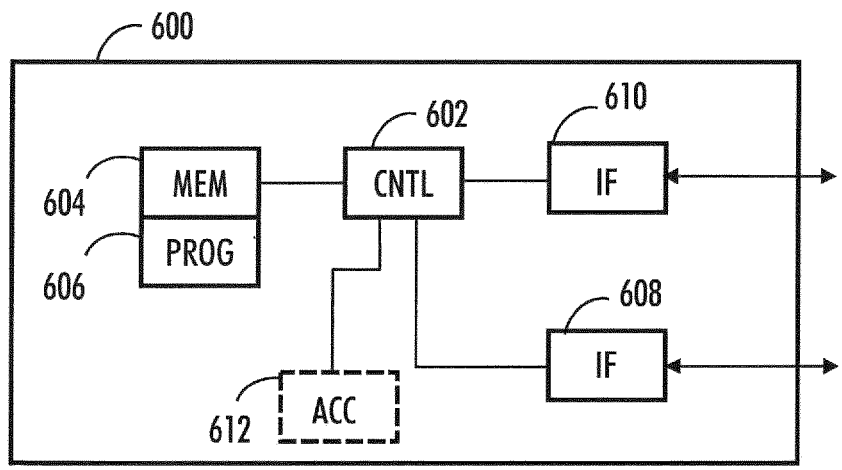
FIG. 6 illustrates an example of an apparatus applying embodiments of the invention.

FIG. 6 illustrates an embodiment. The figure illustrates a simplified example of an apparatus applying embodiments of the invention. In some embodiments, the apparatus may be a network element of a Cloud Radio Access Network.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 600 of the example includes a control circuitry 602 configured to control at least part of the operation of the apparatus.

The apparatus may comprise a memory 604 for storing data. Furthermore the memory may store software 606 executable by the control circuitry 602. The memory may be integrated in the control circuitry.

The apparatus further comprises one or more interface circuitries 608, 610 configured to connect the apparatus to other devices and network elements of system. The interface may provide a wired or wireless connection.

In some embodiments, the apparatus may further comprise an accelerator circuitry 612 specifically designed to perform given tasks in connection with the control circuitry.

In an embodiment, the software 606 may comprise a computer program comprising program code means adapted to cause the control circuitry 602 of the apparatus to realise different microservices of the Cloud Radio Access Network.

The Cloud Radio Access Network may comprise several apparatuses of FIG. 6, and the apparatuses may be connected to each other and realise various functions of the Access Network.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. A method to operate a radio access network, where the radio access network comprises three or more resource tiers, each resource tier having different latency/timing requirements, functionalities of the radio access network being realized utilizing network slices and microservices, wherein each network slice is dedicated to a given type of services having similar network characteristics, the method comprising:

realizing resource allocation for the radio access network with three or more control loops, where each control loop of the three or more control loops is configured to allocate resources with different latency requirements, and configured to control resources between the resource tiers;

controlling resources of an inmost resource tier of the three or more resource tiers by an inmost control loop of the three or more control loops having the lowest latency resource allocation of the three or more control loops;

controlling resources of outer resource tiers of the three or more resource tiers by one or more outer control loops of the three or more control loops for less latency critical resource allocation, each of the one or more outer control loops of the three or more control loops having less critical latency requirement compared to control loops closer to the inmost control loop;

realizing functionalities of the radio access network within each network slice as microservices; and managing resource requests across network slices, wherein the one or more outer control loops are responsible for dynamic deployment/redeployment of microservices according to resource usage statistics from a middle control loop of the three or more control loops, the middle control loop being closer to the inmost control loop than the one or more outer control loops, the middle control loop is responsible for intra slice load balancing among microservices according to bandwidth and latency detected by the inmost control loop, and wherein the inmost loop schedules resources within a Transmission Time Interval used in the inmost resource tier.

2. The method of claim 1, further comprising:

detecting by a control loop of the three or more control loops that it is unable to fulfil its resource allocation tasks; and transmitting by the control loop an indication to an outer control loop of the three or more control loops.

3. The method of claim 2, wherein a control loop of the three or more control loops manages resources of an inner control loop of the three or more control loops on the basis of indications transmitted by the inner control loop.

4. The method of claim 1, wherein the functionalities of the radio access network comprise one or more connections of the radio access network, the method further comprising:

detecting that existing microservices cannot provide service to the one or more connections of the radio access network; and dynamically initializing by a control loop of the three or more control loops new microservices or more resources to existing microservices on the basis of the detection.

5. The method of claim 1, wherein when the inmost control loop detects overload, it transmits information about the overload to an outer control loop.

6. The method of claim 5, wherein the outer control loop receives information about the overload from the inmost control loop and controls the resource usage allocated by the inmost control loop.

7. The method of claim 1, further comprising: allocating microservices to different tiers based on the latency requirements of the connections served by the microservices.

8. An apparatus in a radio access network where the radio access network comprises three or more resource tiers, each resource tier having different latency/timing requirements, functionalities of the radio access network being realized utilizing network slices and microservices, wherein each network slice is dedicated to a given type of services having similar network characteristics, the apparatus comprising:

at least one processor; and at least one memory including computer program code, the at least one memory and the computer program code configured to, with the at least one processor, cause the apparatus at least to:

realize resource allocation for the radio access network with three or more control loops, where each control loop of the three or more control loops is configured to allocate resources with different latency requirements, and configured to control resources between the resource tiers, control resources of an inmost resource tier of the three or more resource tiers by an inmost control loop of the three or more control loops having the lowest latency resource allocation of the three or more control loops, control resources of outer resource tiers of the three or more resource tiers by one or more outer control loops of the three or more control loops for less latency critical resource allocation, each of the one or more outer control loops of the three or more control loops having less critical latency requirement compared to control loops closer to the inmost control loop, realize functionalities of the radio access network within each network slice as microservices, and manage resource requests across network slices, wherein the one or more outer control loops are responsible for dynamic deployment/redeployment of microservices according to resource usage statistics from a middle control loop of the three or more control loops, the middle control loop being closer to the inmost control loop than the one or more outer control loops, the middle control loop is responsible for intra slice load balancing among microservices according to bandwidth and latency detected by the inner control loop, and wherein the inmost control loop schedules resources within a Transmission Time Interval used in the inmost resource tier.

9. The apparatus of claim 8, the at least one memory and the computer program code configured to, with the at least one processor, cause the apparatus further to:

detect by a control loop of the three or more control loops that it is unable to fulfil its resource allocation tasks;

transmit by the control loop an indication to an outer control loop of the three or more control loops.

10. The apparatus of claim 8, the at least one memory and the computer program code configured to, with the at least one processor, cause the apparatus further to:

manage resources of an inner control loop based upon indications transmitted by the inner control loop.

11. The apparatus of claim 8, wherein the functionalities of the radio access network comprise one or more connections of the radio access network, the at least one memory and the computer program code configured to, with the at least one processor, cause the apparatus further to:

detect that existing microservices cannot provide service to the one or more connections of the radio access network;

dynamically initialize by a control loop of the three or more control loops new microservices or more resources to existing microservices based upon the detection.

12. The apparatus of claim 8, the at least one memory and the computer program code configured to, with the at least one processor, cause the apparatus further to allocate microservices to different resource tiers based on the latency requirements of the connections served by the microservices.

13. A system, comprising one or more apparatuses in a radio access network where the radio access network comprises three or more resource tiers, each resource tier having different latency/timing requirements, functionalities of the radio access network being realized utilizing network slices and microservices, wherein each network slice is dedicated to a given type of services having similar network characteristics, the at least one of the one or more apparatuses comprising:
- at least one processor; and
- at least one memory including computer program code, the at least one memory and the computer program code configured to, with the at least one processor, cause the apparatus at least to:
- realize resource allocation for the radio access network with three or more control loops, where each control loop of the three or more control loops is configured to allocate resources with different latency requirements, and configured to control resources between the resource tiers,
- control resources of an inmost resource tier of the three or more resource tiers by an inmost control loop of the three or more control loops having the lowest latency resource allocation of the three or more control loops,
- control resources of outer resource tiers of the three or more resource tiers by one or more outer control loops of the three or more control loops for less latency critical resource allocation, each one of the one or more outer control loops of the three or more control loops having less critical latency requirement compared to control loops closer to the inmost control loop,
- realizing functionalities of the radio access network within each network slice as microservices, and
- manage resource requests across network slices, wherein
- the one or more outer control loops are responsible for dynamic deployment/redeployment of microservices according to resource usage statistics from a middle control loop of the three or more control loops, the middle control loop being closer to the inmost control loop than the one or more outer control loops,
- the middle control loop is responsible for intra slice load balancing among microservices according to bandwidth and latency detected by the inmost control loop, and wherein
- the inmost loop schedules resources within a Transmission Time Interval used in the inmost resource tier.

14. A computer program product embodied on a non-transitory distribution medium readable by a computer and comprising program instructions which, when loaded into an apparatus in a radio access network comprising three or more resource tiers, each resource tier having different latency/timing requirements, functionalities of the radio access network being realized utilizing network slices and microservices, wherein each network slice is dedicated to a given type of services having similar network characteristics, cause the apparatus to execute the steps of
- realizing resource allocation for the radio access network with three or more control loops, where each control loop of the three or more control loops is configured to allocate resources with different latency requirements, and configured to control resources between the resource tiers,
- controlling resources of an inmost resource tier of the three or more resource tiers by an inmost control loop of the three or more control loops having the lowest latency resource allocation of the three or more control loops,
- controlling resources of outer resource tiers of the three or more resource tiers by one or more outer control loops of the three or more control loops for less latency critical resource allocation, each one of the one or more outer control loops of the three or more control loops having less critical latency requirement compared to control loops closer to the inmost loop,
- realizing functionalities of the radio access network within each network slice as microservices, and
- managing resource requests across network slices, wherein
- the one or more outer control loops of the three or more control loops are responsible for dynamic deployment/redeployment of microservices according to resource usage statistics from a middle control loop of the three or more control loops, the middle control loop being closer to the inmost control loop than the one or more outer control loops,
- the middle control loop is responsible for intra slice load balancing among microservices according to bandwidth and latency detected by the inmost control loop, and wherein
- the inmost loop schedules resources within a Transmission Time Interval used in the inmost resource tier.

* * * * *